United States Patent
Sasaki et al.

(10) Patent No.: US 7,609,601 B2
(45) Date of Patent: Oct. 27, 2009

(54) INFORMATION RECORDING APPARATUS, INFORMATION RECORDING METHOD AND INFORMATION RECORDING PROGRAM

(75) Inventors: Yoshio Sasaki, Saitama (JP); Hiroyuki Uchino, Saitama (JP); Kunihiko Horikawa, Saitama (JP)

(73) Assignee: Pioneer Corporation, Tokyo (JP)

( * ) Notice: Subject to any disclaimer, the term of this patent is extended or adjusted under 35 U.S.C. 154(b) by 477 days.

(21) Appl. No.: 10/594,525

(22) PCT Filed: Mar. 30, 2005

(86) PCT No.: PCT/JP2005/006082

§ 371 (c)(1),
(2), (4) Date: Sep. 28, 2006

(87) PCT Pub. No.: WO2005/096277

PCT Pub. Date: Oct. 13, 2005

(65) Prior Publication Data

US 2007/0230306 A1    Oct. 4, 2007

(51) Int. Cl.
*G11B 7/00* (2006.01)
(52) U.S. Cl. .................. 369/59.11; 369/59.1; 369/116; 369/47.5
(58) Field of Classification Search .................. None
See application file for complete search history.

(56) References Cited

U.S. PATENT DOCUMENTS 5,732,062 A * 3/1998 Yokoi et al. .............. 369/116

FOREIGN PATENT DOCUMENTS

| JP | 2000-030254 | 1/2000 |
|---|---|---|
| JP | 2003-077128 | 3/2003 |
| JP | 2003-085753 | 3/2003 |
| JP | 2003-187446 | 7/2003 |
| JP | 2005-004906 | 1/2005 |

* cited by examiner

*Primary Examiner*—Muhammad N. Edun
(74) *Attorney, Agent, or Firm*—Young & Thompson

(57) ABSTRACT

An information recording apparatus for recording information with less waveform deformation with an adequate modulation degree and with a high asymmetry, an information recording method, and an information recording program. An information recording apparatus in which a laser beam is applied to a recording medium and a recording mark corresponding to a recording signal is formed includes a light source for emitting a laser beam and signal generating means for generating a recording pulse signal for driving the light source according to the recording signal. The recording pulse signal includes a mark period during which a recording mark is formed and a space period during which no recording mark is formed. During the mark period corresponding to a long mark, the level of the recording pulse signal corresponds to a recording power with which the reproduction compatibility is ensured and the waveform distortion is at or below a predetermined value.

19 Claims, 11 Drawing Sheets

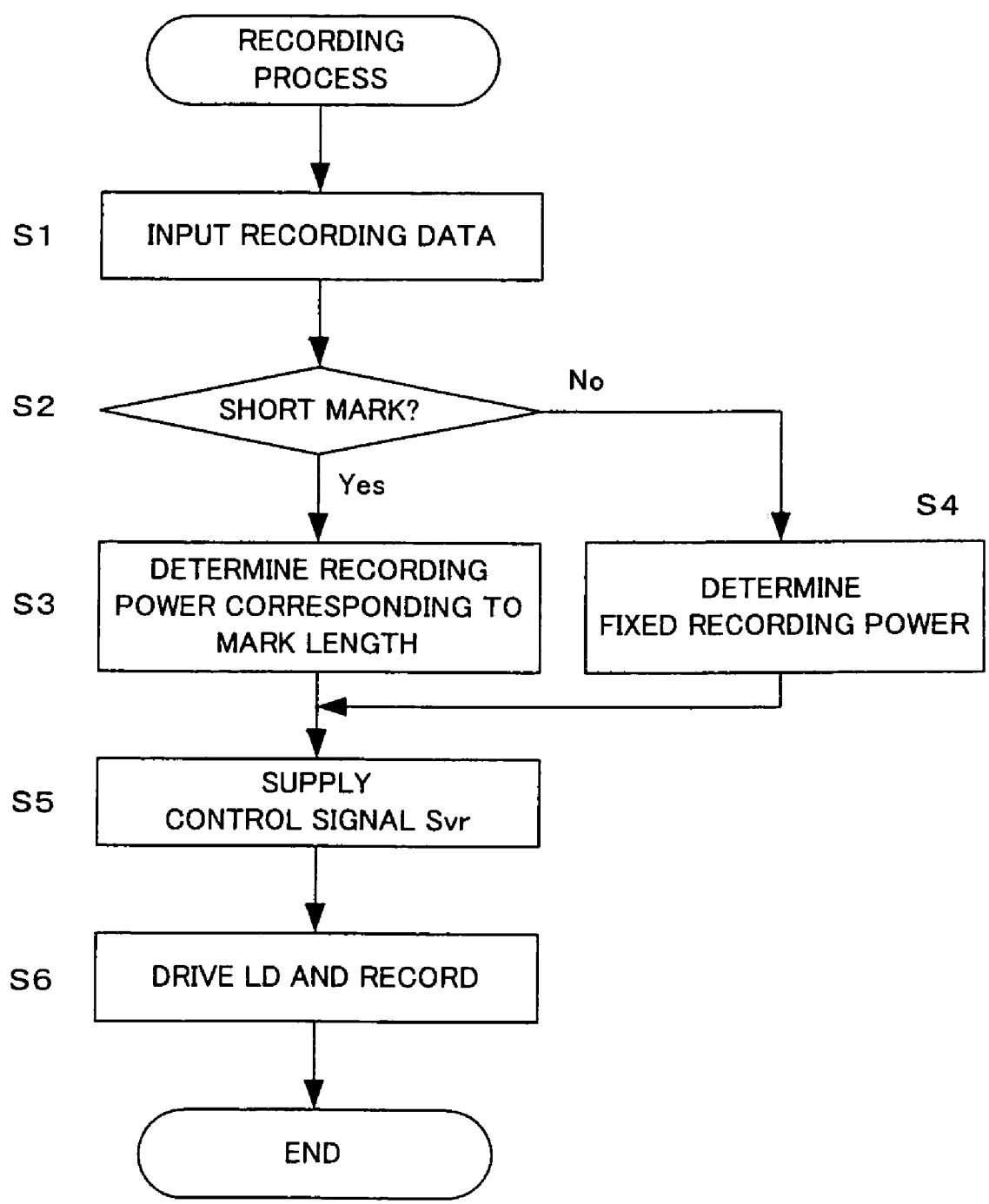

INFORMATION RECORDING APPARATUS, INFORMATION RECORDING METHOD AND INFORMATION RECORDING PROGRAM

TECHNICAL FIELD

The present invention relates to a technique of recording information onto an optical disc by using a laser light.

BACKGROUND TECHNIQUE

Onto a recordable or rewritable optical disc such as a DVD-R (DVD-Recordable) or a DVD-RW (DVD-Re-recordable), information is recorded thereon by irradiating a laser light on a recording surface of the disc. Since a temperature rises at a part on the recording surface of the optical disc to which the laser light is irradiated, a change occurs to an optical recording medium forming the optical disc, and thereby a recording mark is formed onto the recording surface.

Therefore, by modulating the laser light by using a recording pulse having a time width corresponding to information to be recorded, thereby to generate a laser pulse having a length corresponding to a signal to be recorded is generated, and by irradiating the generated laser pulse onto the optical disc, the recording mark having a length corresponding to the information to be recorded can be formed onto the optical disc.

Meanwhile, there is recently used such a control technique of a laser power that one recording mark is formed not by one laser pulse but by a pulse train unit having plural short pulses (also called "pulse train") . In addition, there is proposed a technique of using a recording pulse waveform having a top pulse period, a last pulse period and an intermediate bias period therebetween, instead of a recording pulse waveform having the pulse train, at the time of high-speed recording (see Japanese Patent Applications Laid-open under No. 2003-77128 and No. 2003-85753, for example)

In the above-mentioned recording systems, the laser power in the pulse train period, the top pulse period and the last pulse period has a fixed value irrespective of a mark length. For example, in a write strategy for 8-times high speed recording of a DVD-R, 3T and 4T marks are recorded by a single recording pulse, and a mark equal to or larger than 5T is recorded by the recording pulse waveform having the top pulse period, the last pulse period and the intermediate bias period, as describe above. However, levels thereof, i.e., recording powers, are same.

On the other hand, in a system of 4-times high speed recording of a DVD+R, marks of all lengths are formed by a single recording pulse. However, the levels (i.e., the recording powers) of the 3T and 4T recording pulses become larger than the level of the mark equal to or larger than 5T. Concretely, a ratio of the recording powers of the 3T mark, the 4T mark and the mark equal to or larger than 5T is determined to be constant.

When the recording is performed by the recording pulse waveform having the recording power of one kind or the recording power of the fixed ratio, as recording speed is high, a modulation degree becomes large. But when the modulation degree becomes large, such probability that an adverse effect is given to an AR (Aperture Ratio), an LPP error, an ADIP error becomes large. In addition, asymmetry at which thermal interference occurs becomes close to a lower limit of a standard value or a range enabling reproduction, and a margin thereof becomes narrow.

DISCLOSURE OF INVENTION

The present invention has been achieved in order to solve the above problems. It is an object of this invention to provide an information recording apparatus, an information recording method and an information recording program capable of recording information with an appropriate modulation degree, a high asymmetry and little waveform distortion even at the time of high-speed recording.

According to one aspect of the present invention, there is provided an information recording apparatus which irradiates a laser light onto a recording medium and forms a recording mark corresponding to a recording signal, including: a light source which emits the laser light; and a signal generating unit which generates a recording pulse signal driving the light source based on the recording signal, wherein the recording pulse signal includes a mark period for forming the recording mark and a space period for forming no recording mark, and wherein a level of the recording pulse signal corresponds to a recording power ensuring reproduction compatibility in a mark period corresponding to a long mark, and corresponds to a recording power having asymmetry within a predetermined range in a mark period corresponding to a short mark.

The above information recording apparatus records the information by irradiating the laser light onto the recording medium such as DVD-R/RW and DVD+R/RW and forming the recording mark corresponding to the recording mark. The recording pulse signal forming the recording mark corresponding to the recording signal has the mark period for forming the recording mark and the space period for forming no recording mark. The level of the recording pulse signal corresponds to the recording power ensuring the reproduction compatibility in the mark period corresponding to the long mark, and corresponds to the recording power having the asymmetry within the predetermined range in the mark period corresponding to the short mark. Thereby, since the reproduction compatibility of the recording mark is ensured, the reproduction becomes possible by a different information recording apparatus. In addition, since the recording is performed with in the appropriate asymmetry range, a recording characteristic is improved.

According to another aspect of the present invention, there is provided an information recording apparatus, wherein a level of the recording pulse signal corresponds to a recording power having waveform distortion equal to or smaller than a predetermined value in a mark period corresponding to a long mark, and corresponds to a recording power having asymmetry within a predetermined range in a mark period corresponding to a short mark. Thereby, the waveform distortion does not occur to the recording mark, and the recording is performed within the appropriate asymmetry range. Thus, the recording characteristic is improved.

According to another aspect of the present invention, there is provided an information recording apparatus, wherein a level of the recording pulse signal corresponds to a recording power ensuring reproduction compatibility and having waveform distortion equal to or smaller than a predetermined value in a mark period corresponding to a long mark, and corresponds to a recording power having asymmetry within a predetermined range in a mark period corresponding to a short mark. Thereby, the reproduction compatibility by a different information reproduction apparatus can be ensured. Additionally, the waveform distortion does not occur to the recording mark, and the recording is performed within the appropriate asymmetry range. Thus, the recording characteristic is improved.

In a manner of the above information recording apparatus, the recording power ensuring the reproduction compatibility may be a recording power having a modulation degree within a predetermined range. Namely, the recording power of the long mark is determined so that the modulation degree becomes the predetermined value, and the reproduction compatibility can be ensured. In a preferred example, the recording power may be set to a recording power having a modulation degree equal to or larger than 60%.

In a preferred example of the above information recording apparatus, the recording power having the waveform distortion equal to or smaller than the predetermined value may be a recording power having waveform distortion equal to or smaller than 10%, or may be a recording power having waveform distortion of 0. In another preferred example, the recording power having the asymmetry within the predetermined range may be a recording power having asymmetry within a range of −0.05 to 0.15.

In another manner of the above information recording apparatus, the short mark may be a shortest mark, and the long mark may be a mark other than the short mark. In another manner, the short mark may be a shortest mark and a second shortest mark, and the long mark may be a mark other than the short mark. In still another manner, the short mark may be a mark having a level of no largest magnitude, and the long mark may be a mark having a level of the largest magnitude.

In another manner of the above information recording apparatus, the recording pulse signal may have a same level for all the long marks. In addition, the recording pulse signal may have different levels for each of the short marks.

According to another aspect of the present invention, there is provided an information recording method which irradiates a laser light onto a recording medium and forms a recording mark corresponding to a recording signal, including: a signal generating process which generates a recording pulse signal driving a light source based on the recording signal; and an irradiating process which irradiates a laser pulse onto the recording medium based on the recording pulse signal, wherein the recording pulse signal includes a mark period for forming the recording mark and a space period for forming no recording mark, and wherein a level of the recording pulse signal corresponds to a recording power ensuring reproduction compatibility in a mark period corresponding to a long mark, and corresponds to a recording power having asymmetry within a predetermined range in a mark period corresponding to a short mark.

According to still another aspect of the present invention, there is provided an information recording method, wherein a level of the recording pulse signal corresponds to a recording power having waveform distortion equal to or smaller than a predetermined value in a mark period corresponding to a long mark, and corresponds to a recording power having asymmetry within a predetermined range in a mark period corresponding to a short mark.

According to still another aspect of the present invention, there is provided an information recording method, wherein a level of the recording pulse signal corresponds to a recording power ensuring reproduction compatibility and having waveform distortion equal to or smaller than a predetermined value in a mark period corresponding to a long mark, and corresponds to a recording power having asymmetry within a predetermined range in a mark period corresponding to a short mark.

By the above information recording method, similarly to the above information recording apparatus, the reproduction compatibility can be ensured, and the recording characteristic can be improved.

According to still another aspect of the present invention, there is provided an information recording program executed in an information recording apparatus including a light source, irradiating a laser light onto a recording medium to form a recording mark corresponding to a recording signal, and making the information recording apparatus execute: a signal generating process which generates a recording pulse signal driving the light source based on the recording signal; and an irradiating process which irradiates a laser pulse onto the recording medium based on the recording pulse signal, wherein the recording pulse signal includes a mark period for forming the recording mark and a space period for forming no recording mark, and wherein a level of the recording pulse signal corresponds to a recording power ensuring reproduction compatibility in a mark period corresponding to a long mark, and corresponds to a recording power having asymmetry within a predetermined range in a mark period corresponding to a short mark.

According to another aspect of the present invention, there is provided an information recording program, wherein a level of the recording pulse signal corresponds to a recording power having waveform distortion equal to or smaller than a predetermined value in a mark period corresponding to a long mark, and corresponds to a recording power having asymmetry within a predetermined range in a mark period corresponding to a short mark.

According to still another aspect of the present invention, there is provided an information recording program, wherein a level of the recording pulse signal corresponds to a recording power ensuring reproduction compatibility and having waveform distortion equal to or smaller than a predetermined value in a mark period corresponding to a long mark, and corresponds to a recording power having asymmetry within a predetermined range in a mark period corresponding to a short mark.

By executing the above information recording program in the information recording apparatus, the above information recording apparatus can be realized.

BRIEF DESCRIPTION OF THE DRAWINGS

FIG. 12 is a flow chart of a recording process by the information recording and reproduction apparatus of the embodiment.

BRIEF DESCRIPTION OF THE REFERENCE NUMBER

Figure 1:
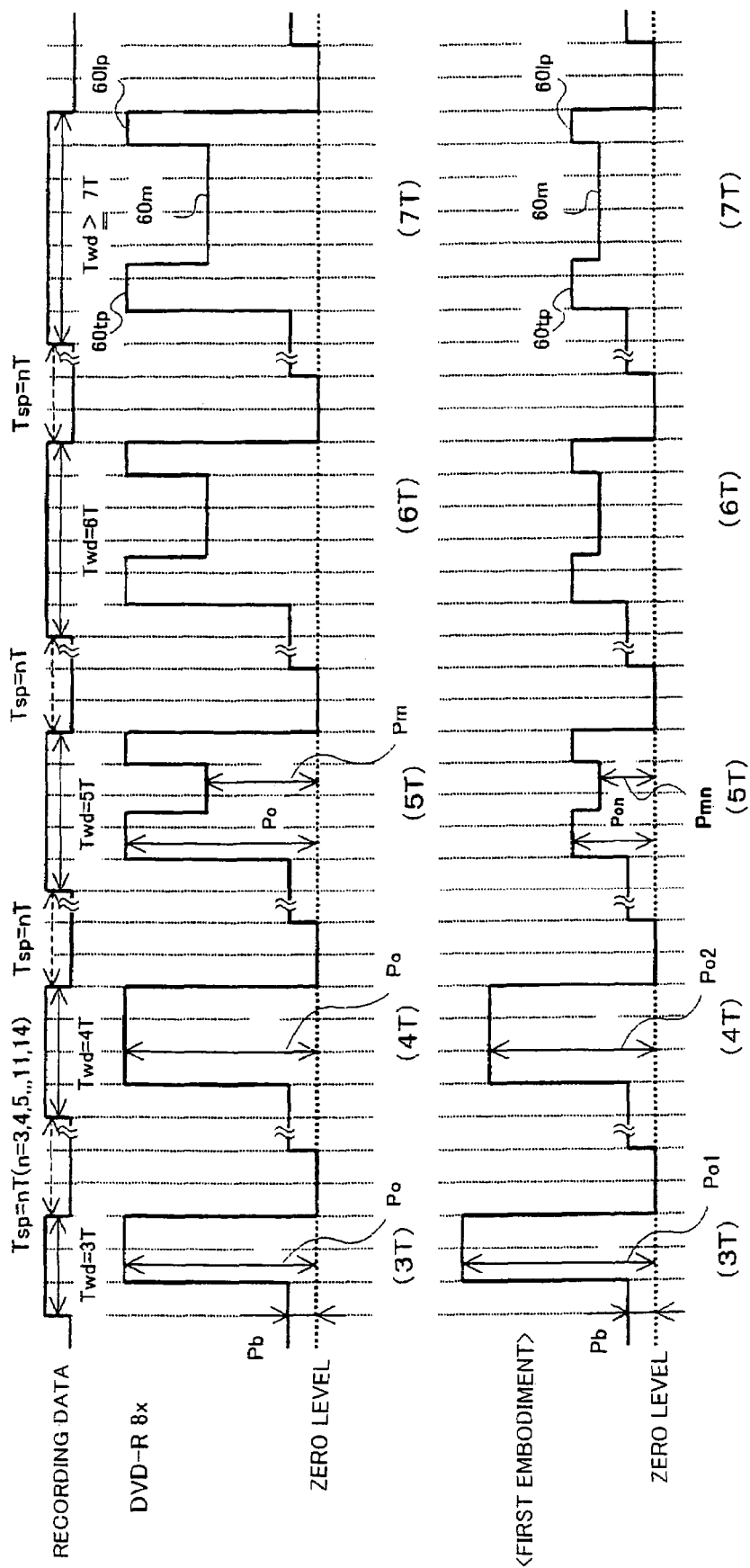
FIG. 1 is a diagram showing a recording pulse waveform according to a first embodiment of the present invention.

1 Information recording and reproduction apparatus
2 Optical pickup
3 Spindle motor
10 Recording control unit
12 LD driver
13 APC circuit
14 Sample-holding circuit
15 Controller
16 Front monitor diode
20 Reproduction control unit
30 Servo control unit

DETAILED DESCRIPTION OF THE PREFERRED EMBODIMENTS

The present invention is characterized in that the recording powers of the long mark and the short mark are separately set in the information recording apparatus which drives the laser light source by the recording pulse signal and records the information. Now, the embodiments will be explained.

First Embodiment

FIG. 1 shows a recording pulse waveform (write strategy) according to a first embodiment. For the purpose of comparison, the recording pulse waveform at the time of 8-times high speed recording of a normal DVD-R is shown at an upper part in FIG. 1, and the recording pulse waveform according to the first embodiment is shown at a lower part in FIG. 1.

In FIG. 1, the recording data includes a mark period Twd having a length corresponding to a recording data length and a space period Tsp having the length corresponding to the recording data length. In the present invention, since the length of the space period does not matter, a part thereof is omitted from the illustration in FIG. 1.

On the DVD-R, the marks of the lengths of 3T and 4T are formed by the recording pulse waveform having the single pulse, and the mark of the length equal to or larger than 5T is formed by the recording pulse waveform formed into a substantially concave (凹) shape and having a top pulse 60$tp$, a last pulse 60$1p$ and an intermediate bias portion 60$m$. Concretely, as shown at the upper part in FIG. 1, at the time of the 8-times high speed recording of the DVD-R, the recording pulse waveforms of 3T and 4T have a period of a bias power Pb, a period of a peak power Po and a period of a zero level. In addition, the recording pulse waveform equal to or larger than 5T has a period of the bias power Pb, the top pulse period 60$tp$ and the last pulse period 60$1p$ of the peak power Po, the period 60$m$ of the intermediate bias power Pm, and the zero level period. As shown in FIG. 1, in the recording pulse waveform at the time of the 8-times high speed recording of the normal DVD-R, the powers of the 3T and 4T marks and the power of the portions of the top pulse and the last pulse of the mark equal to or larger than 5T, which are referred to as "peak powers Po", become same.

In this specification, "recording power" is a concept including the peak power and the intermediate bias power. Namely, when the recording pulse waveform is the mark of 3T and 4T shown in FIG. 1., the recording power is only the peak power. Meanwhile, when the recording pulse waveform is the mark equal to or larger than 5T, the recording power indicates the peak power and the intermediate bias power.

On the other hand, in the present invention, the recording powers of the long mark and the short mark are made different from each other. In the first embodiment, it is defined that "short mark" indicates the shortest mark and the second shortest mark, and "long mark" indicates the mark other than the short mark. Namely, the short mark is the mark of 3T and 4T, and the long mark is the mark equal to or larger than 5T.

Namely, as shown at the lower part in FIG. 1, a peak power Po1 of the recording pulse waveform of the 3T mark and a peak power Po2 of the recording pulse waveform of the 4T mark are different from a peak power Pon of the recording pulse waveform of the mark equal to or larger than 5T. The peak power Pon of any mark equal to or larger than 5T is same.

In FIG. 1, the peak power Po1 of the 3T mark is larger than the peak power Po2 of the 4T mark. However, this is only an example, and the present invention is not limited to this. Thus, the peak power Po1 of the 3T mark and the peak power Po2 of the 4T mark may be same, and one of them may be larger than the other. However, in any case, the peak power Po1 of the 3T mark and the peak power Po2 of the 4T mark are different from the peak power Pon of the mark equal to or larger than 5T.

Next, a description will be given of a determination method of the recording powers of the short mark and the long mark. In this embodiment, the recording power is determined in consideration of the modulation degree, the asymmetry and the waveform distortion as an evaluation parameter of the recording state.

Figure 2:
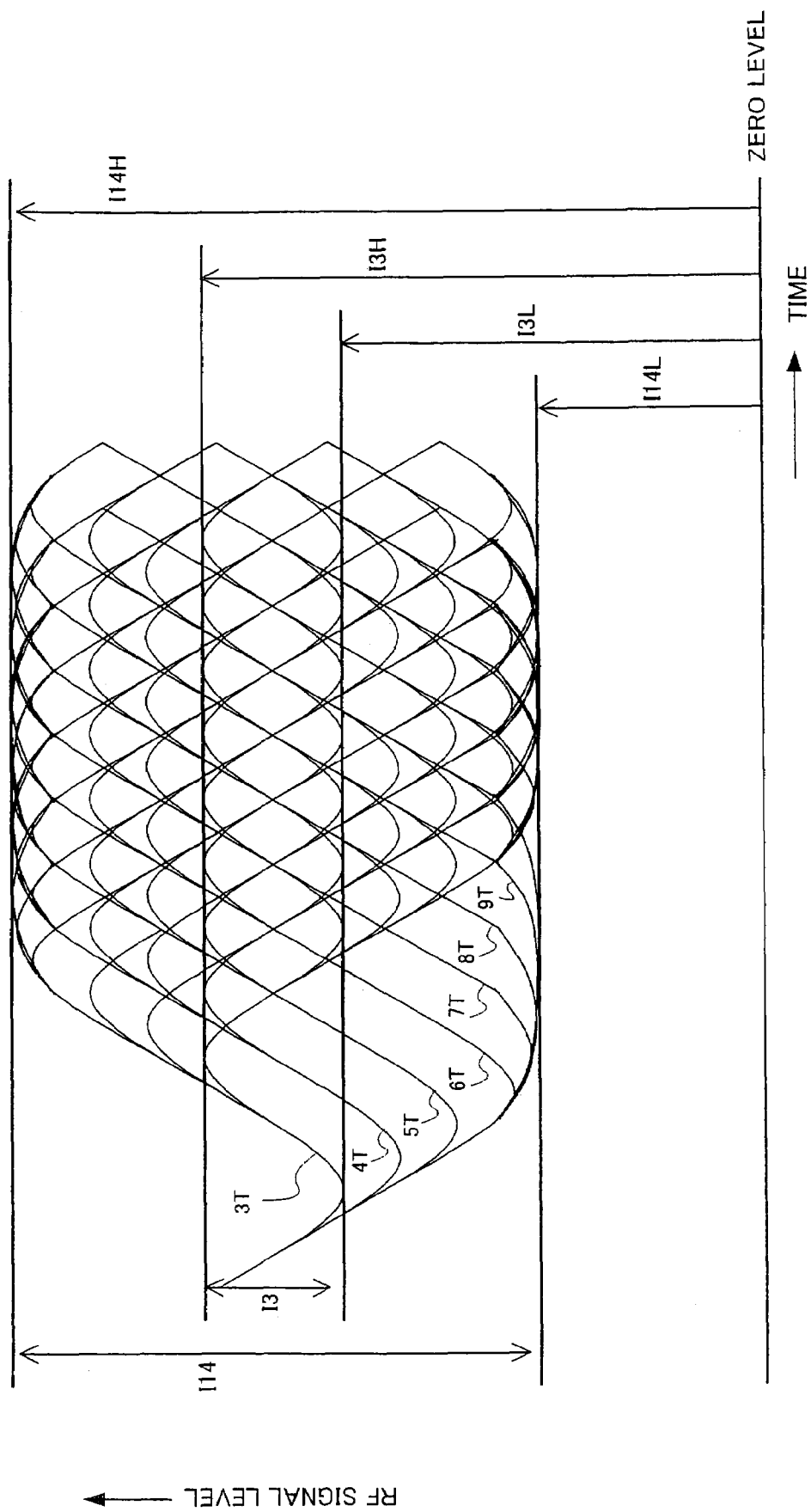
FIG. 2 is a diagram explaining a modulation degree and asymmetry.

FIG. 2 conceptually shows the modulation degree and the asymmetry. "Modulation degree" is a ratio of magnitude of an RF signal (an RF signal obtained by photo-electronically converting the returned light from the recording medium and including a DC component) obtained by reading the data recorded on the recording medium with respect to a difference between the zero level and the peak level of the RF signal. FIG. 2 shows an example of the RF signal waveform obtained by reproducing the recording medium. Namely, the modulation degree is the ratio of an RF signal magnitude I14 with respect to a difference I14H between the zero level and the peak level, which is given by an equation below.

$$\text{Modulation Degree} = I14/I14H \quad (1)$$

Generally, when forming of the recording mark on the recording medium is insufficient, the modulation degree becomes low, and a noise influence to a reproduction signal becomes large. Thus, a S/N ratio decreases, and an adverse effect occurs to the reproduction compatibility. "Having the reproduction compatibility" means that the recording medium recorded by a certain recording apparatus can be appropriately reproduced by a different reproduction apparatus.

"Asymmetry" is a position of the shortest mark with respect to a predetermined long mark, giving the largest magnitude in the RF signal reproduced from the recording medium, and it is concretely given by an equation below.

$$\text{Asymmetry} = \{(I14H+I14L)/2 - (I3H+I3L)/2\}/I14 \quad (2)$$

Namely, as shown in FIG. 2, it shows a positional relation between the intermediate level of the levels I14H and I14L of the RF signal corresponding to the predetermined long mark (14T mark) and the intermediate level of the levels I3H and I3L of the RF signal corresponding to the shortest mark.

Figure 3:
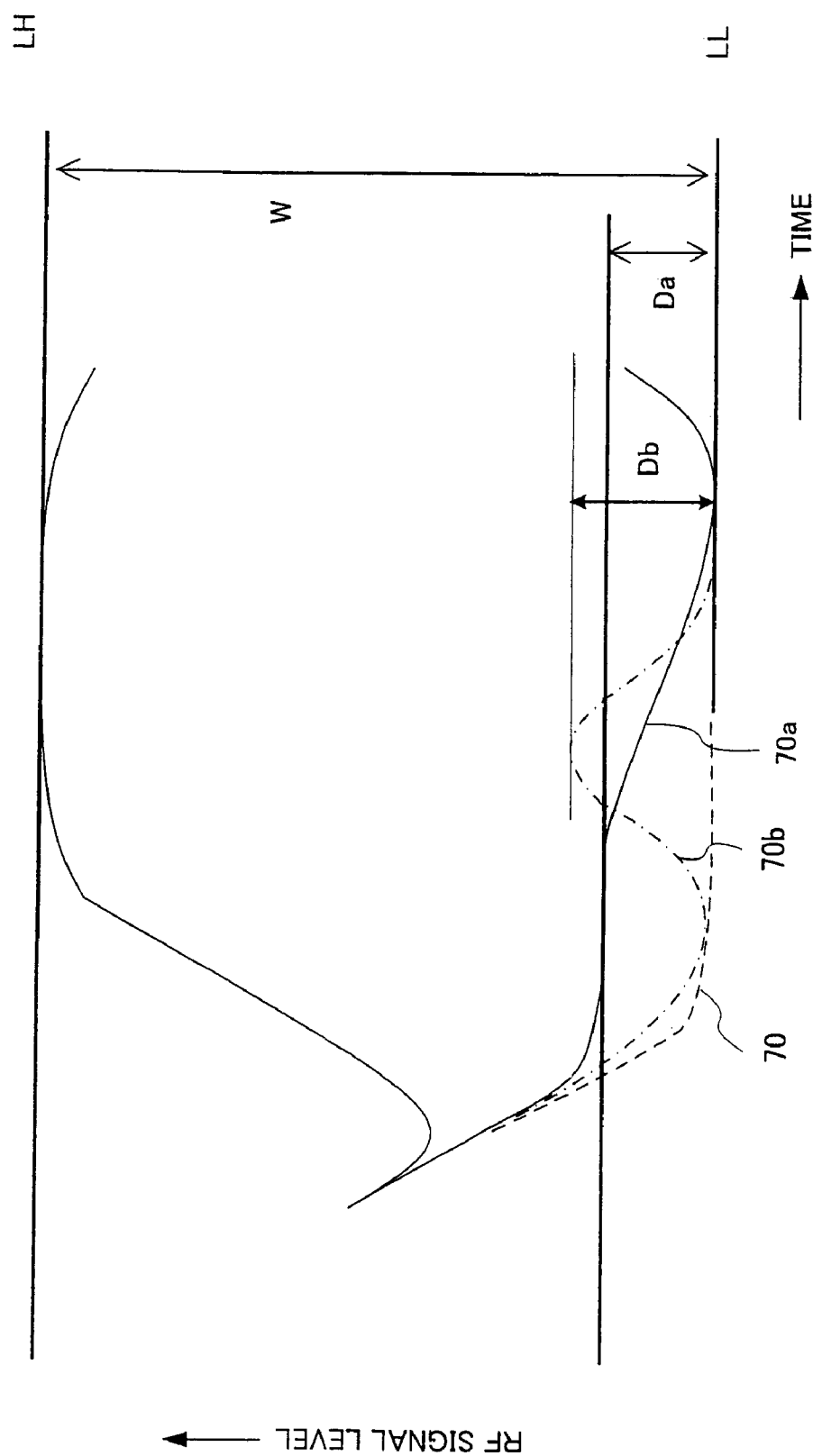
FIG. 3 is a diagram explaining a definition of waveform distortion (distortion ratio)

FIG. 3 schematically shows a definition of the waveform distortion (distortion ratio). In FIG. 3, the waveform distortion is a ratio of distortion amount D with respect to magnitude W of the RF signal. The distortion amount indicates a difference between an original level LL and the level actually appearing in the RF signal waveform. In FIG. 3, a broken-line graph 70 is the RF signal waveform having no distortion, and the distortion amount is "0". A graph 70a is an example of the RF signal waveform having the distortion, and the distortion amount is Da. In addition, a graph 70b is another example of the RF signal waveform having the distortion, and the distortion amount is Db. As shown by the graphs 70a and 70b, the waveform distortion can be a difference between the original level LL and a level at which the RF signal waveform temporarily becomes substantially flat (i.e., substantially zero inclination).

In addition, although FIG. 3 shows such an example that the distortion occurs to a side of a bottom level of the RF signal waveform, the distortion can sometimes occur to the side of the peak level of the RF signal waveform. The distortion ratio in this embodiment includes both cases.

Figure 4:
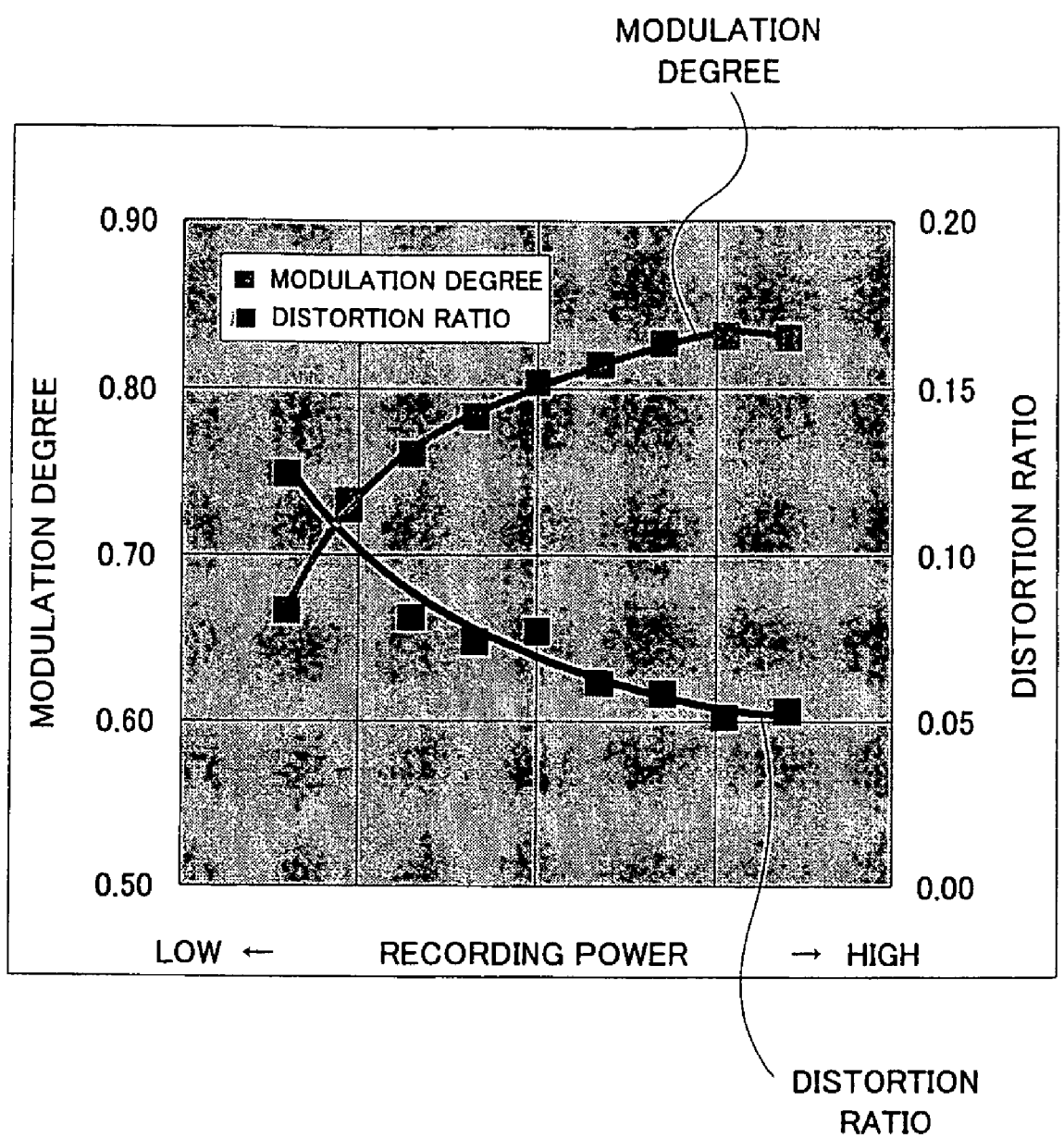
FIG. 4 is a graph showing a relation of a recording power, the modulation degree and the distortion ratio.

Next, a description will be given of the determination method of the recording powers of the long mark and the short mark. First, the recording power of the long mark will be explained. In this embodiment, the recording power of the long mark is determined to be one of the followings:

(Condition-A) recording power within a range capable of ensuring reproduction compatibility (Condition-B) recording power by which the waveform distortion does not occur or does become equal to or smaller than the predetermined value (Condition-C) recording power satisfying both of Condition-A and Condition-B First, the Condition-A relating to the reproduction compatibility will be explained. FIG. 4 shows the relation of the recording power, the modulation degree and the distortion ratio. As shown in FIG. 4, as the recording power increases, the modulation degree becomes large. But the increase is saturated at the recording power of a certain extent. According to a DVD standard, the modulation degree equal to or larger than 60% is required in order to ensure the reproduction compatibility, and the upper limit is not defined.

However, as the modulation degree becomes large, such probability that an adverse effect is given to an LPP error ratio and an AR in a case of the DVD-R and an ADIP error ratio in a case of the DVD+R becomes large. The AR indicates a numerical aperture of the LPP detecting waveform in the DVD-R, and it is an index whether or not the LPP can be appropriately detected. The LPP error ratio shows the error ratio of the LPP signal in the reproduction RF signal. As described above, though the modulation degree is preferably equal to or larger than 60% in order to ensure the reproduction compatibility, if the modulation degree becomes too large, a width of a pit formed on a groove of the recording medium becomes large. Thereby, it sometimes occurs that the LPP formed adjacently to the groove cannot be read. Thus, the AR and the LPP error ratio are deteriorated. In addition, in the case of the DVD+R, if the modulation degree becomes too large, the formed pit becomes too large, and a pre-address prerecorded on the disc cannot be read. Thereby, the ADIP error ratio becomes deteriorated.

Additionally, if the modulation degree is large, a thermal influence to the other mark adjacently arranged, particularly to the short mark, increases, and deterioration of the recording characteristic occurs due to the thermal interference. Further, as shown in FIG. 4, since variation amount of the modulation degree with respect to the variation of the recording power becomes small, when the modulation degree is used for the detection of the characteristic, e.g., ROPC (Running Optimum Power Control), detection accuracy decreases.

As described above, if the modulation degree is too large, various kinds of problems can occur. Therefore, it is preferable that the modulation degree is made as small as possible within the range capable of ensuring the reproduction compatibility, e.g., substantially "0.6" (60%). Additionally, in view of preventing the above-mentioned various kinds of problems, it is preferable that the upper limit of the modulation degree is set to substantially "0.8" (80%) in FIG. 4. Therefore, it is preferable that the peak power Pon of the long mark is set within the range capable of ensuring the reproduction compatibility. Concretely, it is preferable that the modulation degree is within the range of substantially 0.6 to 0.8. Particularly, the modulation degree is preferably set to substantially 0.6.

Next, a description will be given of the Condition-B relating to the waveform distortion (distortion ratio). Although the waveform distortion is different dependently on the recording condition and the recording medium, in the example in FIG. 4, as the recording power decreases, the distortion ratio increases. As the distortion ratio becomes large, the recording characteristic becomes deteriorated. Thus, the peak power Pon of the long mark is preferably determined so that the waveform distortion does not occur or does sufficiently become small (e.g., equal to or smaller than 10%). The graph of the distortion ratio shown in FIG. 4 is only an example. Hence, dependently on the recording condition and the recording medium, there can be a case showing such a characteristic that, as the recording power increases, the distortion ratio increases.

In this manner, as shown in the Condition-C, the recording power of the long mark is most preferably determined so that the Condition-A relating to the reproduction compatibility and the Condition-B relating to the waveform distortion are simultaneously satisfied.

Figure 5A:
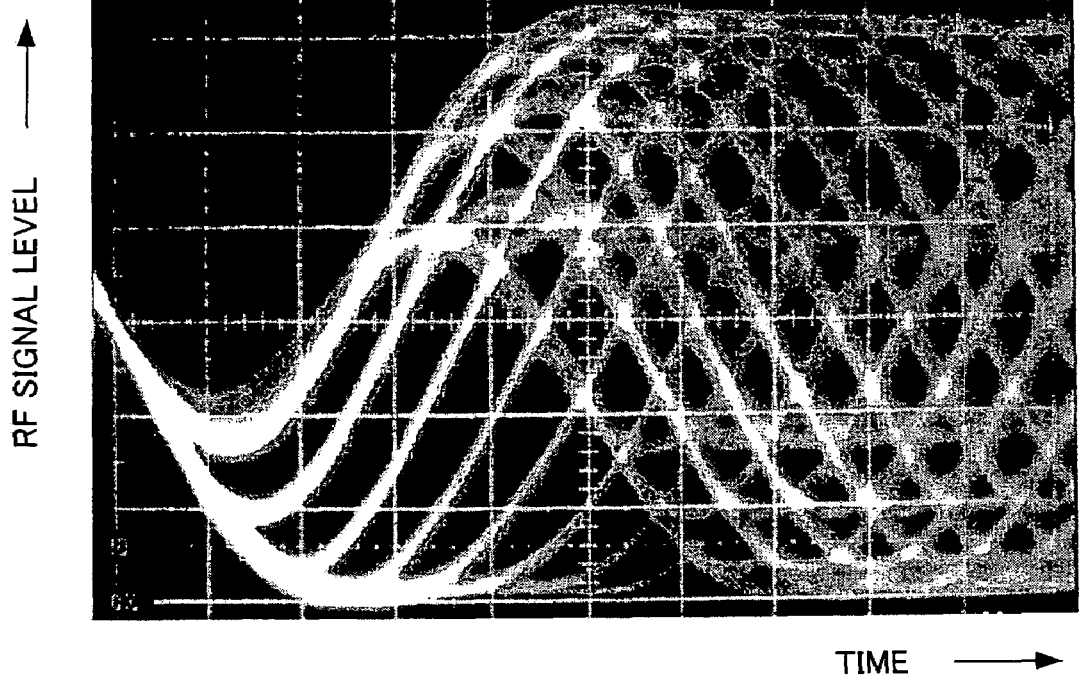
FIGS. 5A and 5B show waveform examples of reproduction RF signals of data recorded by a normal recording method and by a recording method of the embodiment.
Figure 5B:
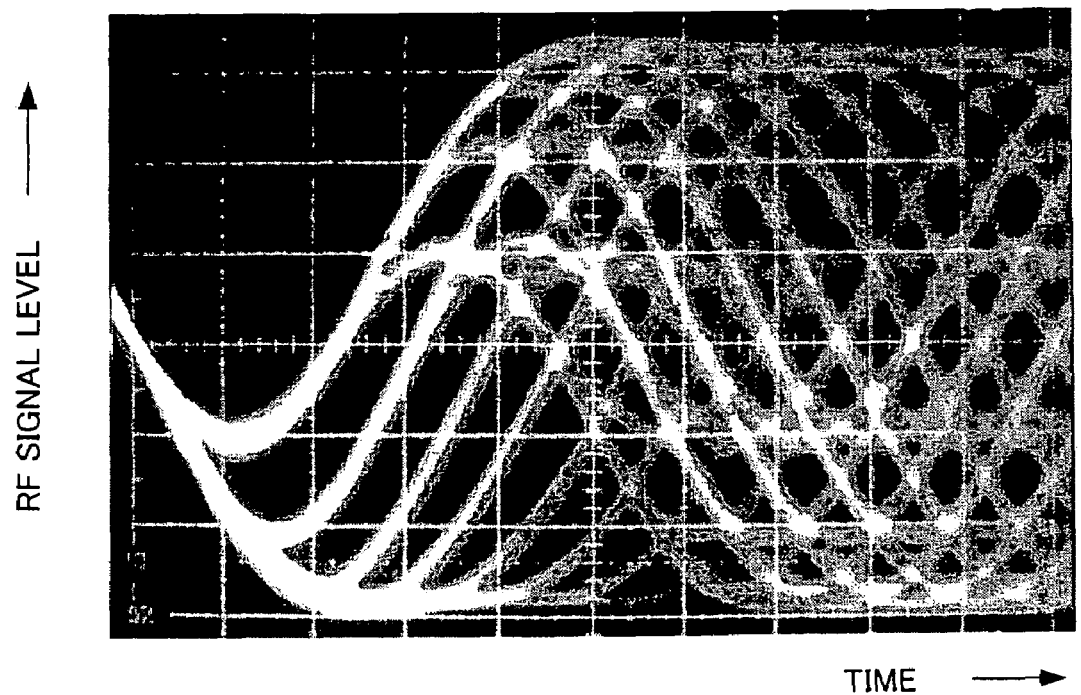

Next, a description will be given of the determination method of the recording power of the short mark. FIGS. 5A and 5B show waveform diagrams to compare the influences of the thermal interferences by the normal method and by this embodiment. FIG. 5A is by the normal method, which is the reproduction RF signal waveform in such a case that the marks of all the lengths are formed by the same recording power, as shown at the upper part in FIG. 1. Meanwhile, as shown at the lower part in FIG. 1, FIG. 5B is the reproduction RF signal waveform in such a case that the short mark (3T and 4T) and the long mark (equal to or larger than 5T) are formed by the different recording power. In both cases, the asymmetry is within the appropriate range.

As shown in FIG. 5A, the level of the waveform of the 3T mark varies due to the influence of the thermal interference, and the waveform like a barbel occurs. Thereby, though the asymmetry is within the appropriate range, the recording characteristic (jitter) becomes deteriorated.

Meanwhile, as shown in FIG. 5B, in this embodiment, no influence of the thermal interference occurs to the waveform of the 3T mark. By making the recording powers of the short mark and the long mark different to record them, the power at the time of the recording of the long mark reduces the thermal influence given to the short mark, as compared with the normal case of the recording of all the marks with using the same recording power. Thus, the short mark can be recorded within the range in which no thermal interference occurs. Namely, like this embodiment, it is preferable that the recording power of the short mark is made different from the recording power of the long mark and the peak powers Po1 and Po2 being the short marks are determined within a range in which the appropriate asymmetry (e.g., −0.05 to 0.15 according to the DVD standard) can be obtained.

Second Embodiment

Figure 6:
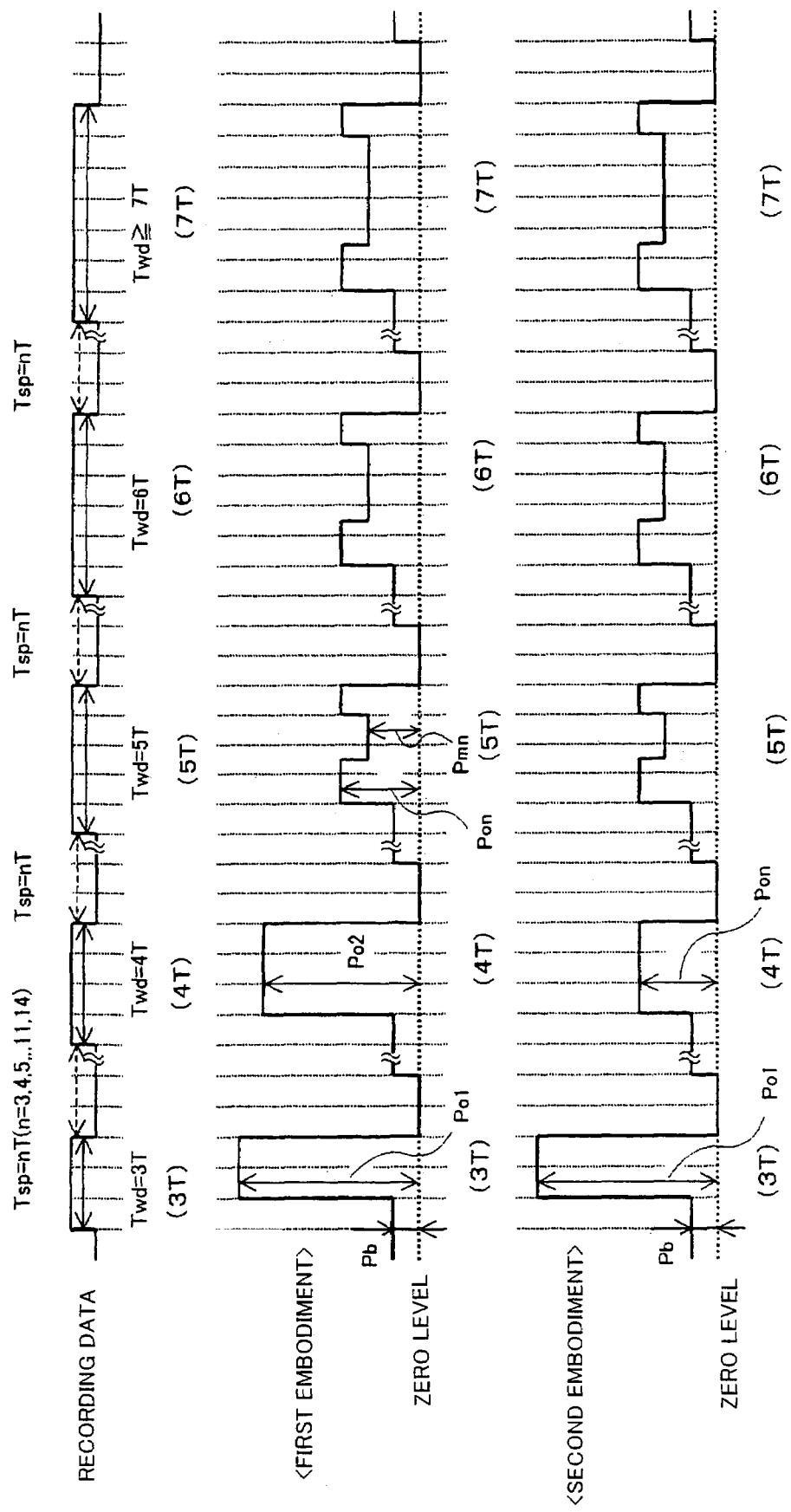
FIG. 6 is a diagram showing the recording pulse waveform according to a second embodiment.

Next, a second embodiment of the present invention will be explained. Only a definition method of the long mark and the short mark of the second embodiment is different from that of the first embodiment. FIG. 6 shows the recording pulse waveform diagram in the first and second embodiments. As shown, in the first embodiment, the shortest mark (3T) and the second shortest mark (4T) are defined as the short mark, and the mark (equal to or larger than 5T) other than the short mark is defined as the long mark. Then, the peak powers Po1 and Po2 of the short mark are made different from the peak power Pon of the long mark.

Meanwhile, in the second embodiment, only the shortest mark (3T) is defined as the short mark, and the mark (equal to or larger than 4T) other than the shortest mark is defined as the long mark. Therefore, as shown in FIG. 6, the peak power Po1 of the short mark and the peak power Pon of the long mark are made different.

The determination method of the recording powers of the short mark and the long mark is same as that of the first embodiment. Namely, the peak power Pon of the long mark is determined within the range capable of ensuring the recording compatibility, more concretely, so that the modulation degree is within the predetermined range. In addition, the peak power Po1 being the short mark is determined so that the asymmetry is within the appropriate range.

Third Embodiment

Figure 7:
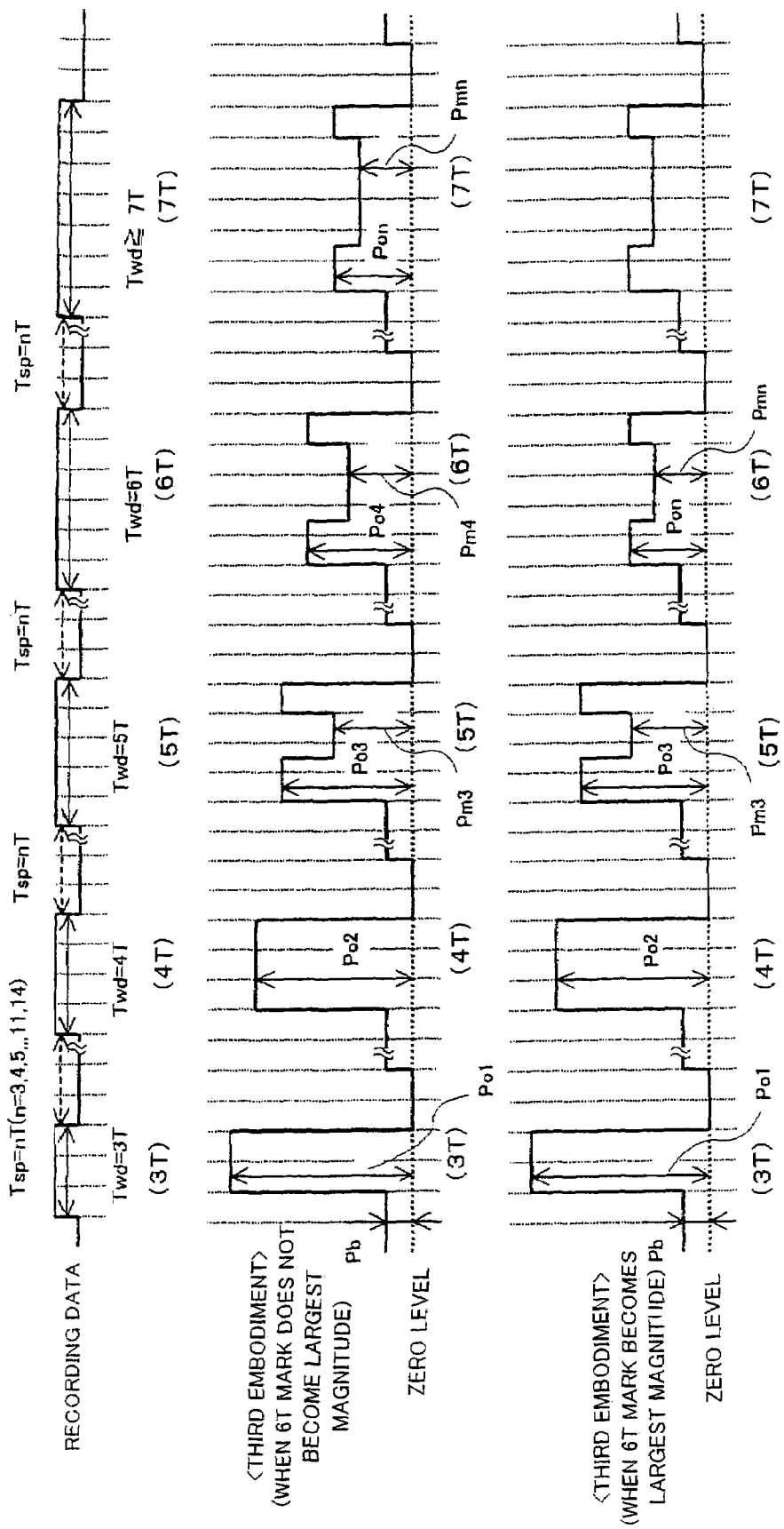
FIG. 7 is a diagram showing the recording pulse waveform according to a third embodiment.

Next, a third embodiment will be explained. The third embodiment is also different from the first embodiment only in the definition method of the long mark and the short mark. FIG. 7 shows the recording pulse waveform diagram in the third embodiment. The recording pulse waveform in such a case that a 6T mark does not become the largest magnitude is shown at an upper part of FIG. 7, and the recording pulse waveform in such a case that the 6T mark becomes the largest magnitude is shown at a lower part of FIG. 7.

In the third embodiment, it is defined that the mark whose RF signal waveform does not become the largest magnitude is the short mark and the mark whose RF signal waveform becomes the largest magnitude is the long mark. However, whether or not a certain mark becomes the largest magnitude may change dependently on the recording condition and the recording medium. Normally, the marks of 3T to 5T do not become the largest magnitude, and the mark equal to or larger than 7T becomes the largest magnitude. But the mark of 6T sometimes becomes and sometimes does not become the largest magnitude. Thus, when the mark of 6T does not become the largest magnitude, the marks of 3T to 6T are defined as the short marks, and the mark equal to or larger than 7T is defined as the long mark (see the upper part of FIG. 7). Meanwhile, when the mark of 6T becomes the largest magnitude, the marks of 3T to 5T are defined as the short marks, and the mark equal to or larger than 6T is defined as the long mark.

The determination method of the recording powers of the short mark and the long mark is same as that of the first embodiment. Namely, the peak power Pon of the long mark is determined within the range capable of ensuring the recording compatibility, more concretely, so that the modulation degree is within the predetermined range. In addition, the peak powers Po1 to Po4 of the short marks are determined so that the asymmetry is within the appropriate range.

Embodiment of Information Recording and Reproduction Apparatus

Figure 8:
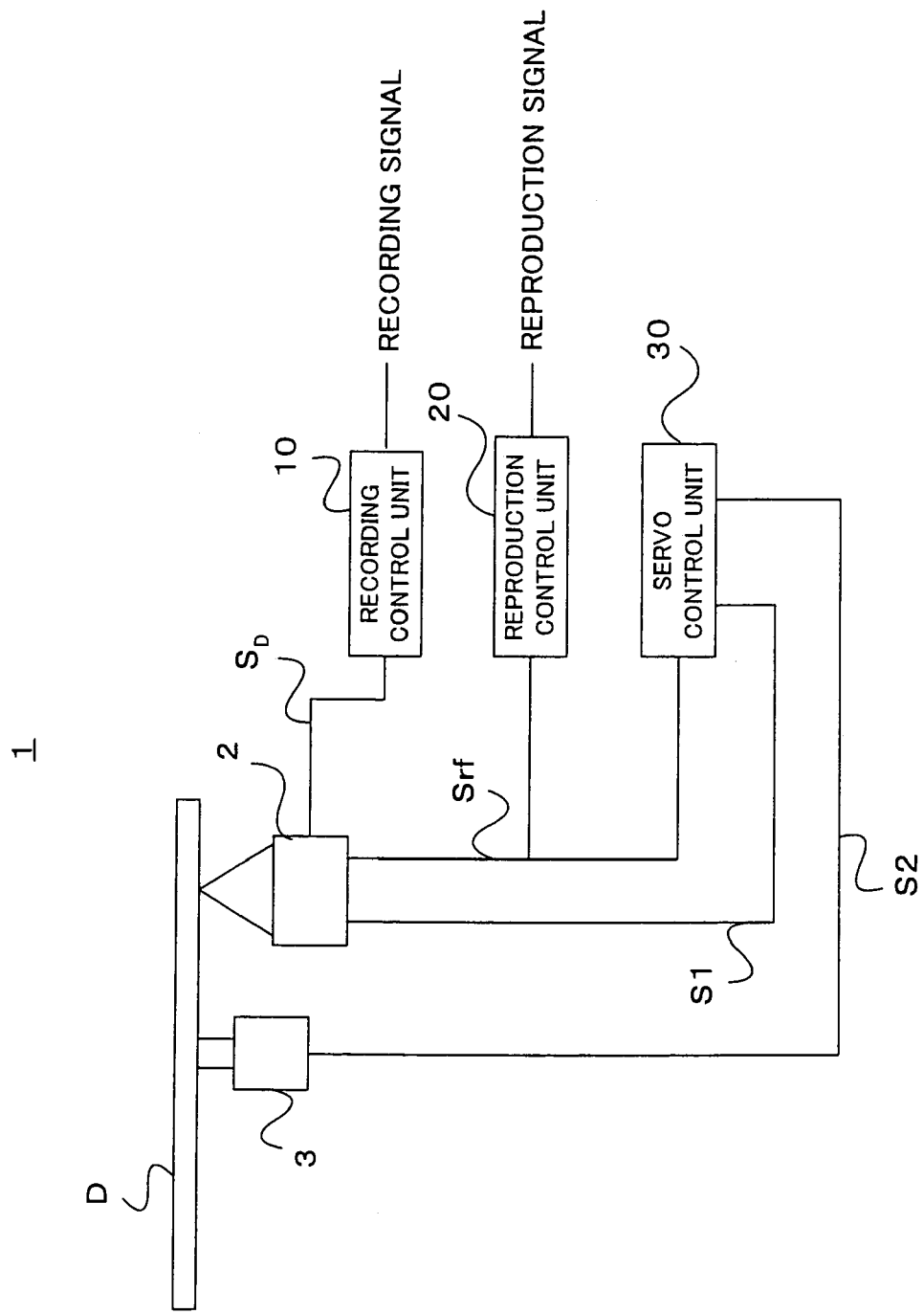
FIG. 8 is a block diagram schematically showing a configuration of an information recording and reproduction apparatus to which the present invention is applied.

FIG. 8 schematically shows the entire configuration of an information recording and reproduction apparatus to which the present invention is applied. An information recording and reproduction apparatus 1 records information onto an optical disc D and reproduces the information from the optical disc D. Various kinds of optical discs such as DVD-R/RW and DVD+R/RW are usable as the optical disc D.

The information recording and reproduction apparatus 1 includes an optical pickup 2 for irradiating a recording beam and a reproduction beam onto the optical disc D, a spindle motor 3 for controlling rotation of the optical disc D, a recording control unit 10 for controlling the recording of the information onto the optical disc D, a reproduction control unit 20 for controlling the reproduction of the information recorded on the optical disc D, and a servo control unit 30 for executing various kinds of servo control including a spindle servo controlling rotation of the spindle motor 3, a focus servo and a tracking servo being a relative position control to the optical disc D of the optical pickup 2.

The recording control unit 10 receives a recording signal and generates a driving signal $S_D$ for driving a laser diode in the optical pickup 2 by a process, which will be explained later, to supply it to the optical pickup 2.

The reproduction control unit 20 receives a read-out RF signal Srf outputted from the optical pickup 2 and applies predetermined demodulation process and decoding process to it. Then, the reproduction control unit 20 generates a reproduction signal to output it.

The servo control unit 30 receives the read-out RF signal Srf from the optical pickup 2, and based on it, supplies a servo signal S1 such as a tracking error signal and a focus signal to the optical pickup 2. At the same time, the servo control unit 30 supplies the spindle servo signal S2 to the spindle motor 3. Thereby, various kinds of servo processes such as the tracking servo, the focus servo and the spindle servo are executed.

The present invention mainly relates to a recording method in the recording control unit 10. Since various kinds of known methods are applicable to the reproduction control and the servo control, detailed explanations thereof are not given.

Additionally, though FIG. 8 shows the information recording and reproduction apparatus as an embodiment of the present invention, the present invention can be applied to an information recording apparatus dedicated to recording.

Figure 9:
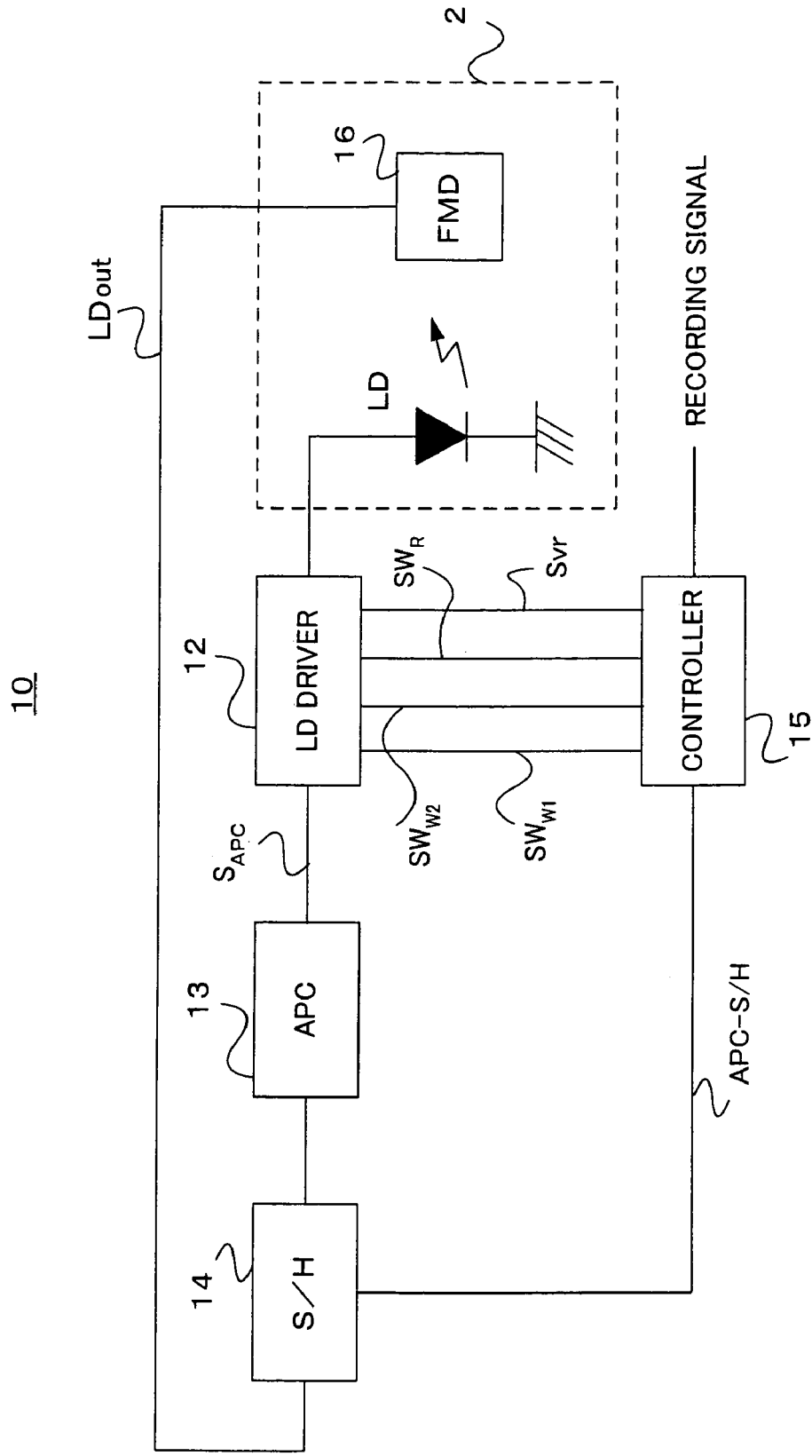
FIG. 9 is a block diagram showing a configuration of a recording control unit shown in FIG. 8.

FIG. 9 shows an inner configuration of the optical pickup 2 and the recording control unit 10. As shown in FIG. 9, the optical pickup 2 includes the laser diode LD for generating the recording beam for recording the information on the optical disc D and the reproduction beam for reproducing the information from the optical disc D, and a front monitor diode (FMD) 16 for receiving the laser light emitted from the laser diode LD and outputting a laser power level signal LDout corresponding to the laser light.

The optical pickup 2 further includes known components such as a photo detector for receiving a reflected beam by the optical disc D of the reproduction beam and generating the read-out RF signal Srf, and an optical system guiding the recording beam, the reproduction beam and the reflected beam in an appropriate direction. But illustrations and detailed explanations thereof are omitted.

Meanwhile, the recording control unit 10 includes a laser diode (LD) driver 12, an APC (Automatic Power Control) circuit 13, a sample-holding (S/H) circuit 14 and a controller 15.

The LD driver 12 supplies a current corresponding to the recording signal to the laser diode LD and records the information onto the optical disc D. The front monitor diode 16 is arranged in the vicinity of the laser diode LD in the optical pickup 2 and receives the laser light emitted from the laser diode LD to output the laser power level signal LDout showing a level thereof.

The sample-holding circuit 14 samples and holds the level of the laser power level signal LDout at a timing defined by a sample-holding signal APC-S/H. Based on the output signal of the sample-holding circuit 14, the APC circuit 13 executes the power control of the LD driver 12 so that the bias power level of the laser light emitted from the laser diode LD becomes constant.

The controller 15 mainly executes recording operation and APC operation. First, the recording operation will be explained. In the recording operation, the controller 15 generates switch signals SWR, SWw1 and SWw2, controlling the current amount supplied to the laser diode LD, and a control signal Svr to supply them to the LD driver 12.

Figure 10:
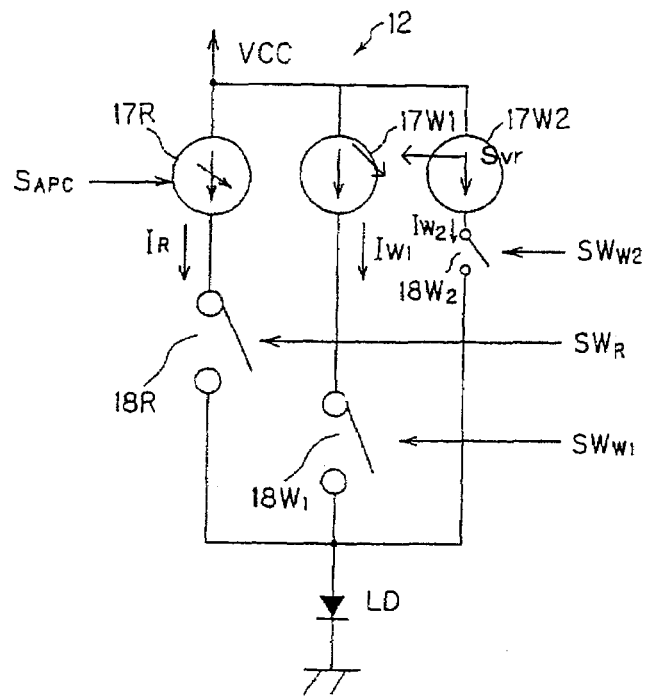
FIG. 10 is a block diagram showing a configuration of an LD driver shown in FIG. 9.

FIG. 10 shows the detailed configuration of the LD driver 12. As shown in FIG. 10, the LD driver 12 includes a current source 17R for the bias level, current sources 17W1 and 17W2 for the write level and switches 18R, 18W1 and 18W2.

The current source 17R for the bias level applies the driving current $I_R$ for emitting the laser light at the bias power Pb to the laser diode LD, and the driving current $I_R$ is supplied to the laser diode LD via the switch 18R. Therefore, when the switch 18R is in an ON state, the driving current $I_R$ of the bias power is supplied to the laser diode LD. When the switch 18R is in an OFF state, the supply of the driving current $I_R$ stops. The magnitude of the driving current $I_R$ from the current source 17R is varied by the control signal $S_{APC}$.

The current sources 17W1 and 17W2 for the write level apply driving currents Iw1 and Iw2 for emitting the laser light by the write power to the laser diode LD, respectively. The driving current Iw1 is supplied to the laser diode LD via the switch 18W1, and the driving current Iw2 is supplied to the laser diode LD via the switch 18W2.

In the write strategy according to the present invention, the write powers of two levels, i.e., the first write power (peak power) Po and the second write power (intermediate bias power) Pm lower than the first write power, are used (see FIG. 1). When the switch 18R is in the ON state and the switch 18W1 is further on the ON state, the sum driving current of the driving currents $I_R$ and Iw1 is supplied to the laser diode LD. Thereby, the laser diode is driven by the second write power Pm. In addition, when the switches 18R and 18W1 are on the ON states and the switch 18W2 is further the ON state, the driving current Iw2 is further supplied to the laser diode LD. As a result, the sum driving current of the driving currents $I_R$, Iw1 and Iw2 is applied to the laser diode, and the laser diode is driven by the first write power Po. When the switch 18W1 is on the OFF state, the supply of the driving current Iw1 stops. When the switch 18W2 is on the OFF state, the supply of the driving current Iw2 stops. The control signal Svr is supplied to the current source 17W2 from the controller 15, and the current source 17W2 supplies the driving current Iw2 corresponding to the control signal Svr to the laser diode LD.

Figure 11:
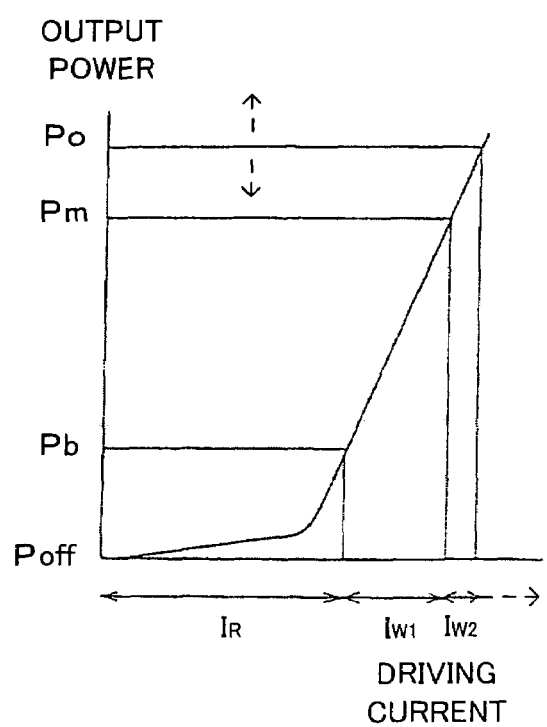
FIG. 11 is a graph showing a relation between a driving current and an output power of an LD.

FIG. 11 shows a relation between the driving current supplied to the laser diode LD and the output power of the laser light emitted from the laser diode LD. As understood from FIG. 11, when the driving current $I_R$ is supplied to the laser diode LD, the laser light is emitted by the bias power Pb. When the driving current Iw1 is further applied in the state, the laser light is emitted by the second write power Pm. When the driving current Iw2 is further applied, the laser light is emitted by the first write power Po.

At the time of recording of the information onto the optical disc, basically the driving current $I_R$ is always supplied and the laser light is emitted by the bias power Pb. Then, the driving currents Iw1 and Iw2 are further applied in correspondence to the recording pulse. Thereby, the first write power Po or the second write power Pm is applied, and the information is recorded onto the optical disc.

Additionally, in correspondence to the control signal Svr supplied from the controller 15, the first write power (peak power) Po is varied. As shown in FIG. 9, the controller 15 receives the recording signal and determines whether each of the recording data included in the recording signal is the short mark or the long mark. Then, the controller 15 supplies the control signal Svr to the current source 17W2 in correspondence with the result. Thereby, when the recording data is the long mark, the current source 17W2 is controlled so that the first write power Po becomes the constant peak power Pon. When the recording data is the short data, the current source 17W2 is controlled so that the first write power Po becomes the peak powers Po1 or Po2 different from the constant peak power Pon. Thereby, as shown in each of the above-mentioned embodiments, the recording powers of the short mark and the long mark can be made different. The determination of the short mark and the long mark by the controller 15 is different in each of the first to third embodiments, as described above.

Next, the APC operation will be explained. The APC operation adjusts the driving current level supplied to the laser diode LD from the LD driver 12 so that the level of the bias power of the laser light outputted by the laser diode LD becomes constant. More concretely, in the long space period (e.g., the space periods of 5T to 11T and 14T) of a space portion of the recording signal (which is 8-16-modulated and has the mark periods of 3T to 11T and 14T and the space period), the driving signal $S_D$ from the recording control unit 10 is adjusted so that the level of the bias power Pb becomes constant.

Concretely, the APC operation is executed as follows. As described above, the controller 15 generates the recording pulse corresponding to the recording signal and drives the LD driver 12 by the recording pulse to make the laser light emitted from the laser diode LD.

The front monitor diode 16, arranged in the vicinity of the laser diode LD in the optical pickup 2, receives the laser light emitted from the laser diode LD and generates the laser power level signal LDout showing the level to supply it to the sample-holding circuit 14.

The sample-holding circuit 14 samples the laser power level signal LDout supplied from the front monitor diode 16 at the timing given by the sample-holding signal APC-S/H inputted from the controller 15, and holds the level for a predetermined period. The sample-holding signal APC-S/H outputted from the controller 15 is a pulse showing a period (referred to as "APC period") in which the APC is executed.

Thus, the sample-holding circuit 14 holds the level of the laser power level signal LDout in the APC period in the space period of the recording signal to supply it to the APC circuit 13. The APC circuit 13 supplies the control signal $S_{APC}$ to the LD driver 12 so that the level of the laser power level signal LDout in the APC period becomes constant.

As shown in FIG. 10, the control signal $S_{APC}$ is inputted to the current source 17R for the bias level in the LD driver 12.

Thereby, in correspondence to the control signal $S_{APC}$, the current $I_R$ applied from the current source 17R for the bias level varies. Namely, the APC is executed so that the bias power level obtained by the laser diode LD becomes constant.

Next, a description will be given of a recording process by the above-mentioned information recording and reproduction apparatus. The controller 15 shown in FIG. 9 controls the LD driver 12 based on the recording signal supplied from the external. Mainly by the control, the recording process which will be described below is executed. FIG. 12 shows a flow chart of the recording process. By executing a program prepared in advance and corresponding to a process shown below, the controller 15 can execute the recording process.

First, when receiving the recording signal including plural recording data (step S1), the controller 15 determines whether each of the plural data included in the recording signal is the short mark or the long mark. As described above, the determination is different in the first to third embodiments. When determining that the recording data is the short mark (step S2; Yes), the controller 15 determines the recording power corresponding to the mark length (step S3). For example, in the case of the first embodiment, the controller 15 determines the peak power as Po1 when the short mark is 3T, and the peak power as Po2 when the short mark is 4T. Meanwhile, when determining that the recording data is the long mark (step S2; No), the controller 15 determines the peak power as the fixed value Pon (step S4).

The controller 15 supplies, to the LD driver 12, the control signal Svr corresponding to the recording power determined in step S3 or S4 (step S12). Based on the supplied control signal Svr, the LD driver 12 drives the laser diode LD and records the recording mark corresponding to the recording data onto the disc D (step S6). In this manner, the inputted recording signal is recorded onto the disc D.

[Modification]

In the above embodiments, such examples that the present invention is applied to the DVD-R/RW and the DVD+R/RW are shown. However, the present invention is similarly applicable to a Blu-ray disc, an HD DVD and a DVD-RAM, too.

INDUSTRIAL APPLICABILITY

This invention can be used for the information recording apparatus, the information reproduction apparatus and the information recording and reproduction apparatus which record the information onto the recording medium such as the optical disc and/or reproduce the information from the recording medium by irradiating the laser light thereon.

The invention claimed is:

1. An information recording apparatus which irradiates a laser light onto a recording medium and forms a recording mark corresponding to a recording signal, comprising:
 a light source which emits the laser light; and
 a signal generating unit which generates a recording pulse signal driving the light source based on the recording signal and including a mark period for forming the recording mark and a space period for forming no recording mark,
 wherein the signal generating unit makes a level of the recording pulse signal corresponds to a recording power ensuring reproduction compatibility in a mark period corresponding to a long mark and corresponds to a recording power having asymmetry within a predetermined range in a mark period corresponding to a short mark, thereby to generate the recording pulse signal.

2. The information recording apparatus according to claim 1, wherein the recording power ensuring the reproduction compatibility is a recording power having a modulation degree within a predetermined range.

3. The information recording apparatus according to claim 2, wherein the recording power having the modulation degree within the predetermined range is a recording power having a modulation degree equal to or larger than 60%.

4. The information recording apparatus according to claim 1, wherein the recording power having the asymmetry within the predetermined range is a recording power having asymmetry within a range of −0.05 to 0.15.

5. The information recording apparatus according to claim 1, wherein the short mark is a shortest mark, and the long mark is a mark other than the short mark.

6. The information recording apparatus according to claim 1, wherein the short mark is a shortest mark and a second shortest mark, and the long mark is a mark other than the short mark.

7. The information recording apparatus according to claim 1, wherein the short mark is a mark having a level of no largest magnitude, and the long mark is a mark having a level of the largest magnitude.

8. The information recording apparatus according to claim 1, wherein the recording pulse signal has a same level for all the long marks.

9. The information recording apparatus according to claim 1, wherein the recording pulse signal has different levels for each of the short marks.

10. An information recording apparatus which irradiates a laser light onto a recording medium and forms a recording mark corresponding to a recording signal, comprising:
 a light source which emits the laser light; and
 a signal generating unit which generates a recording pulse signal driving the light source based on the recording signal and including a mark period for forming the recording mark and a space period for forming no recording mark,
 wherein the signal generating unit makes a level of the recording pulse signal corresponds to a recording power having waveform distortion equal to or smaller than a predetermined value in a mark period corresponding to a long mark and corresponds to a recording power having asymmetry within a predetermined range in a mark period corresponding to a short mark, thereby to generate the recording pulse signal.

11. The information recording apparatus according to claim 10, wherein the recording power having the waveform distortion equal to or smaller than the predetermined value is a recording power having waveform distortion equal to or smaller than 10%.

12. The information recording apparatus according to claim 10, wherein the recording power having the waveform distortion equal to or smaller than the predetermined value is a recording power having waveform distortion of 0.

13. An information recording apparatus which irradiates a laser light onto a recording medium and forms a recording mark corresponding to a recording signal, comprising;
 a light source which emits the laser light; and
 a signal generating unit which generates a recording pulse signal driving the light source based on the recording signal and including a mark period for forming the recording mark and a space period for forming no recording mark,
 wherein the signal generating unit makes a level of the recording pulse signal corresponds to a recording power ensuring reproduction compatibility and having waveform distortion equal to or smaller than a predetermined value in a mark period corresponding to a long mark and corresponds to a recording power having asymmetry within a predetermined range in a mark period corresponding to a short mark, thereby to generate the recording pulse signal.

14. An information recording method which irradiates a laser light onto a recording medium and forms a recording mark corresponding to a recording signal, comprising:
 a signal generating process which generates a recording pulse signal driving a light source based on the recording signal and including a mark period for forming the recording mark and a space period for forming no recording mark; and
 an irradiating process which irradiates a laser pulse onto the recording medium based on the recording pulse signal,
 wherein the signal generating process makes a level of the recording pulse signal corresponds to a recording power ensuring reproduction compatibility in a mark period corresponding to a long mark and correspond to a recording power having asymmetry within a predetermined range in a mark period corresponding to a short mark, thereby to generate the recording pulse signal.

15. An information recording method which irradiates a laser light onto a recording medium and forms a recording mark corresponding to a recording signal, comprising
 a signal generating process which generates a recording pulse signal driving a light source based on the recording signal and including a mark period for forming the recording mark and a space period for forming no recording mark; and
 an irradiating process which irradiates a laser pulse onto the recording medium based on the recording pulse signal,
 wherein the signal generating process makes a level of the recording pulse signal corresponds to a recording power having waveform distortion equal to or smaller than a predetermined value in a mark period corresponding to a long mark and correspond to a recording power having asymmetry within a predetermined range in a mark period corresponding to a short mark, thereby to generate the recording pulse signal.

16. An information recording method which irradiates a laser light onto a recording medium and forms a recording mark corresponding to a recording signal, comprising:
 a signal generating process which generates a recording pulse signal driving a light source based on the recording signal and including a mark period for forming the recording mark and a space period for forming no recording mark; and
 an irradiating process which irradiates a laser pulse onto the recording medium based on the recording pulse signal,
 wherein the signal generating process makes a level of the recording pulse signal corresponds to a recording power ensuring reproduction compatibility and having waveform distortion equal to or smaller than a predetermined value in a mark period corresponding to a long mark and correspond to a recording power having asymmetry within a predetermined range in a mark period corresponding to a short mark, thereby to generate the recording pulse signal.

17. A computer-readable recording medium with a computer program recorded thereon executed in an information recording apparatus including a light source, irradiating a laser light onto a recording medium to form a recording mark corresponding to a recording signal, and making the information recording apparatus execute:
 a signal generating process which generates a recording pulse signal driving the light source based on the recording signal and including a mark period for forming the recording mark and a space period for forming no recording mark; and
 an irradiating process which irradiates a laser pulse onto the recording medium based on the recording pulse signal,
 wherein the signal generating process makes a level of the recording pulse signal corresponds to a recording power ensuring reproduction compatibility in a mark period corresponding to a long mark and correspond to a recording power having asymmetry within a predetermined range in a mark period corresponding to a short mark, thereby to generate the recording pulse signal.

18. A computer-readable recording medium with a computer program recorded thereon executed in an information recording apparatus including a light source, irradiating a laser light onto a recording medium to form a recording mark corresponding to a recording signal, and making the information recording apparatus execute:
 a signal generating process which generates a recording pulse signal driving the light source based on the recording signal and including a mark period for forming the recording mark and a space period for forming no recording mark; and
 an irradiating process which irradiates a laser pulse onto the recording medium based on the recording pulse signal,
 wherein the signal generating process makes a level of the recording pulse signal corresponds to a recording power having waveform distortion equal to or smaller than a predetermined value in a mark period corresponding to a long mark and correspond to a recording power having asymmetry within a predetermined range in a mark period corresponding to a short mark, thereby to generate the recording pulse signal.

19. A computer-readable recording medium with a computer program recorded thereon executed in an information recording apparatus including a light source, irradiating a laser light onto a recording medium to form a recording mark corresponding to a recording signal, and making the information recording apparatus execute:
 a signal generating process which generates a recording pulse signal driving the light source based on the recoding signal and including a mark period for forming the recording mark and a space period for forming no recording mark; and
 an irradiating process which irradiates a laser pulse onto the recording medium based on the recording pulse signal,
 wherein the signal generating process makes a level of the recording pulse signal corresponds to a recording power ensuring reproduction compatibility and having waveform distortion equal to or smaller than a predetermined value in a mark period corresponding to a long mark and correspond to a recording power having asymmetry within a predetermined range in a mark period corresponding to a short mark, thereby to generate the recording pulse signal.

\* \* \* \* \*

UNITED STATES PATENT AND TRADEMARK OFFICE
CERTIFICATE OF CORRECTION

| | | |
|---|---|---|
| PATENT NO. | : 7,609,601 B2 | Page 1 of 1 |
| APPLICATION NO. | : 10/594525 | |
| DATED | : October 27, 2009 | |
| INVENTOR(S) | : Sasaki et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 506 days.

Signed and Sealed this

Twelfth Day of October, 2010

David J. Kappos
*Director of the United States Patent and Trademark Office*